(No Model.)
F. J. WATERS.
PACKING.
No. 539,371. Patented May 14, 1895.
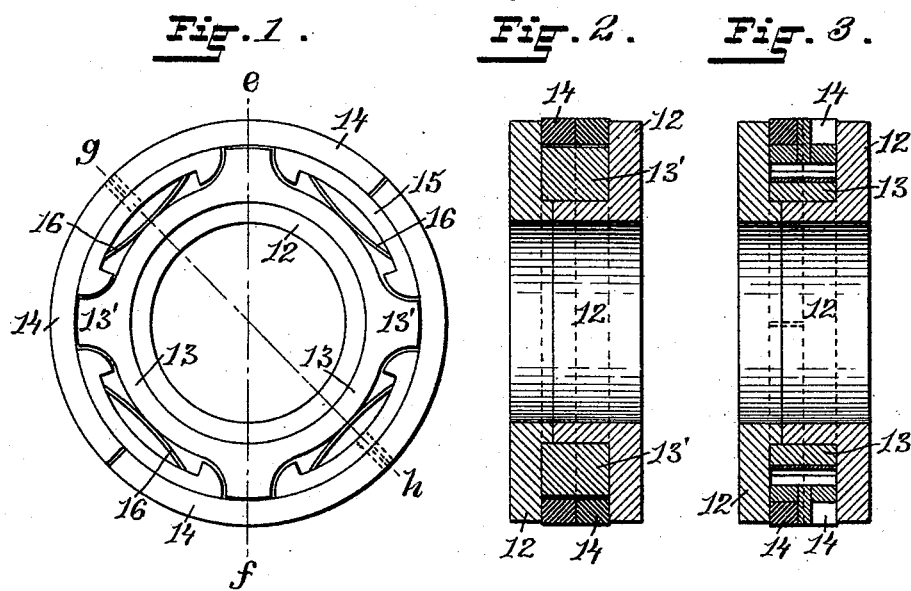
WITNESSES:
Henry J. Millers
Chas. H. Luther Jr.
INVENTOR:
Frank J. Waters
by Joseph A. Miller & Co
Attys

UNITED STATES PATENT OFFICE.

FRANK J. WATERS, OF PROVIDENCE, RHODE ISLAND.

PACKING.

SPECIFICATION forming part of Letters Patent No. 539,371, dated May 14, 1895.

Application filed February 8, 1893. Serial No. 461,439. (No specimens.)

*To all whom it may concern:*

Be it known that I, FRANK J. WATERS, of Providence, in the county of Providence and State of Rhode Island, have invented certain new and useful Improvements in Packing; and I hereby declare that the following is a full, clear, and exact description of the same, reference being had to the accompanying drawings, forming part of this specification.

This invention has reference to improvements in metallic packing adapted particularly for use in pistons and slide-valves.

The object of the invention is to produce metallic packings which will be automatically adjustable to wear.

The further object of the invention is to provide metallic packings which will not require fitting to adjust them to the surfaces against which they bear.

The invention consists in certain peculiar features and novel combination of parts which will hereinafter be more fully described and pointed out in the claim.

Figure 1 represents a face view of the improved packing. Fig. 2 represents a sectional view of the same, taken on the line *e f*, Fig. 1. Fig. 3 represents a similar view taken on the line *g h*, Fig. 1.

Similar numbers of reference designate corresponding parts throughout.

In carrying my invention into practice I construct a case or support for the adjustable portions. This support consists of the plates 12—12 having central openings surrounded by annular flanges which abut against each other and serve to hold the plates 12—12 apart leaving an annular groove between them. The flanges of the plate 12 are embraced by a ring 13—13 having radial projections 13'—13', and surrounding the circumference of this ring are two or more layers of split rings 14—14 the halves of which are expansibly secured by pins to followers 15 which are adapted to conform to the interior of the packing-rings and to be forced against these rings by the bent springs 16, bearing against the ring 13, and to expand these packing-rings to take up wear on the same and to preserve a tight fit between the rings and a surrounding surface.

It will be understood that the joints of one layer of pieces forming the split rings are located opposite the solid portion of the next layer so as to break joints.

Having thus described my invention, I claim as new and desire to secure by Letters Patent—

The combination with the casing 12 formed in halves and having a central-bore and a flange surrounding the bore, and a ring 13 having projections 13' surrounding said flange, of two or more layers of rings 14, split transversely, arranged so that the joints of one layer will come opposite the solid portion of the others, followers 15 contained within said rings, and the springs 16 adapted to force these followers outward to expand the rings, as described.

In witness whereof I have hereunto set my hand.

FRANK J. WATERS.

Witnesses:
J. A. MILLER, Jr.,
M. F. BLIGH.